(12) United States Patent
Hiraishi et al.

(10) Patent No.: US 9,120,256 B2
(45) Date of Patent: Sep. 1, 2015

(54) INJECTION MOLDING METHOD AND INJECTION MOLDING MACHINE

(71) Applicant: Panasonic Corporation, Kadoma-shi, Osaka (JP)

(72) Inventors: Masakazu Hiraishi, Kyoto (JP); Takashi Nakagawa, Osaka (JP); Akira Yabe, Mie (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 114 days.

(21) Appl. No.: 14/051,181

(22) Filed: Oct. 10, 2013

(65) Prior Publication Data
US 2014/0197570 A1 Jul. 17, 2014

(30) Foreign Application Priority Data
Jan. 11, 2013 (JP) ................................ 2013-003026

(51) Int. Cl.
*B29C 45/14* (2006.01)

(52) U.S. Cl.
CPC ..... *B29C 45/14016* (2013.01); *B29C 45/14065* (2013.01); *B29C 45/14262* (2013.01)

(58) Field of Classification Search
CPC .................................. B29C 45/14016; B29C 45/14262–2045/14278
See application file for complete search history.

(56) References Cited

U.S. PATENT DOCUMENTS

2010/0059172 A1* 3/2010 Yamamoto et al. ........... 156/242

FOREIGN PATENT DOCUMENTS

| JP | 07-060791 | 3/1995 |
|---|---|---|
| JP | 2000-037747 | 2/2000 |
| JP | 2009-083204 | 4/2009 |

OTHER PUBLICATIONS

Japanese Office Action, May 26, 2015; Japanese Patent Application No. 2013-003026 (3 pages).

* cited by examiner

*Primary Examiner* — Jill Heitbrink
(74) *Attorney, Agent, or Firm* — Hamre, Schumann, Mueller & Larson, P.C.

(57) ABSTRACT

After a first die and a second die are opened, a base film of a film is separated from the first die so as to tilt the surface of the film with respect to a parting face of the first die.

3 Claims, 16 Drawing Sheets

F I G. 1
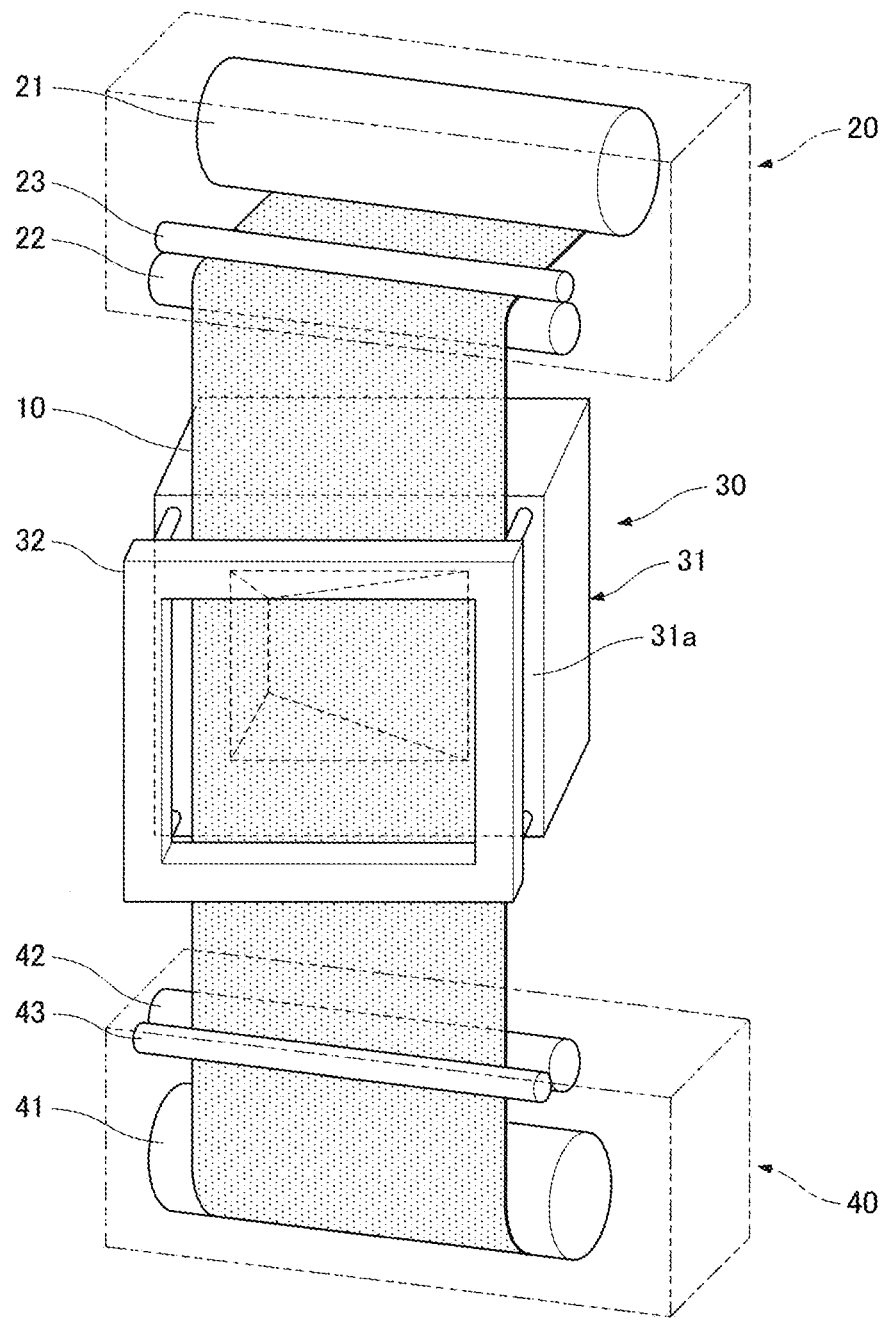

FIG. 2A
FIG. 2B
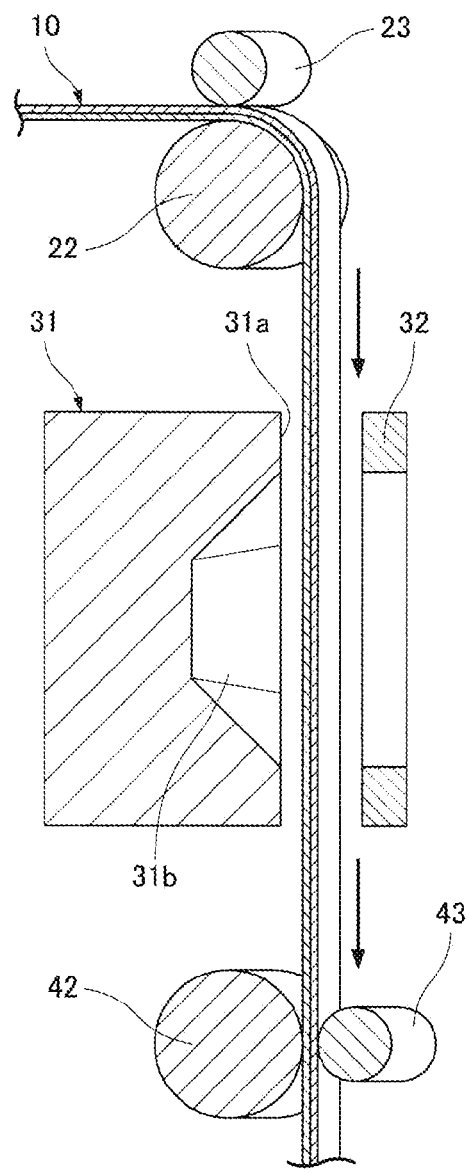
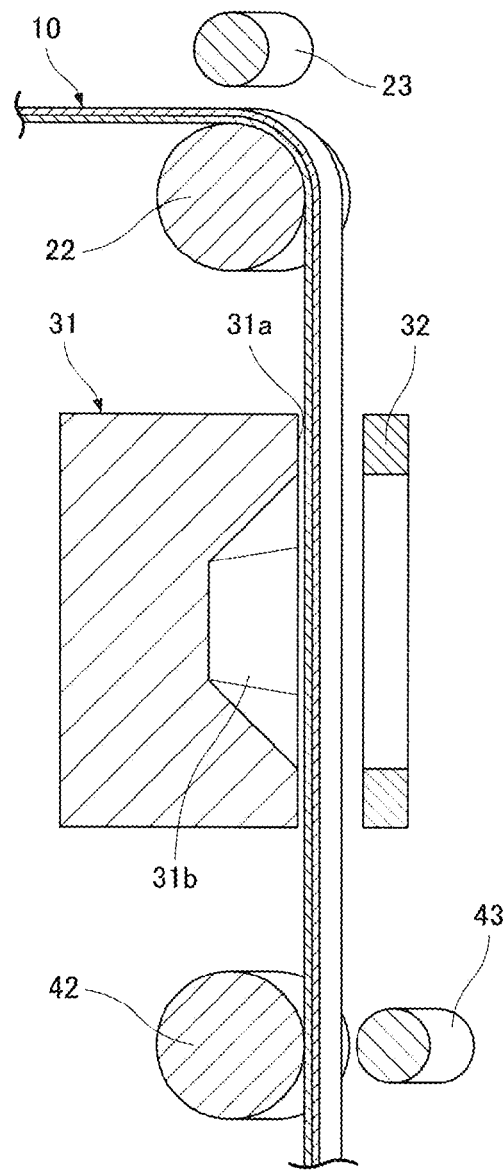

F I G. 2 G
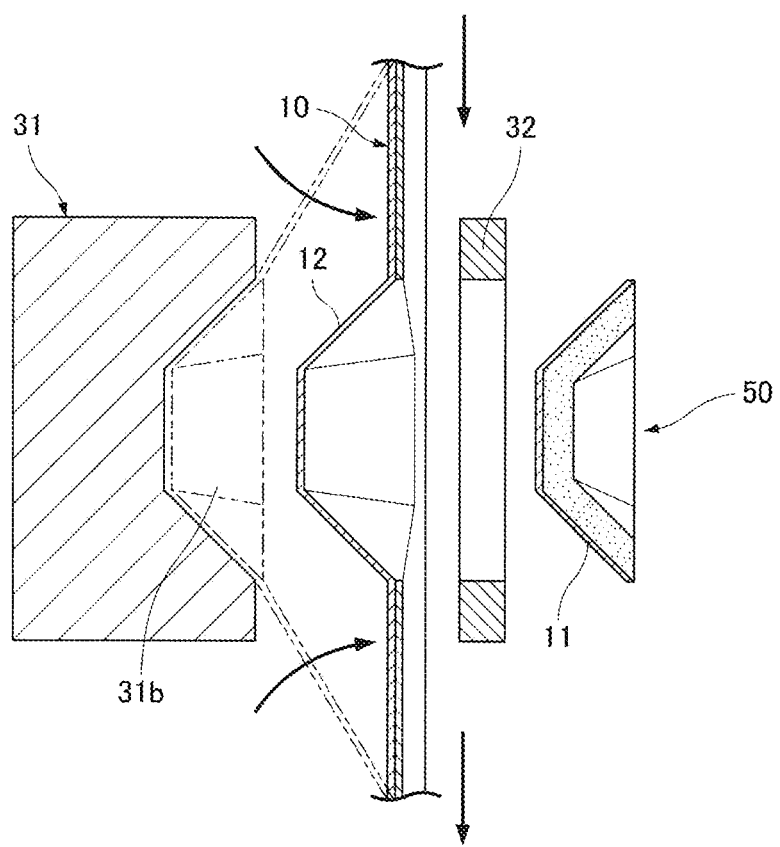

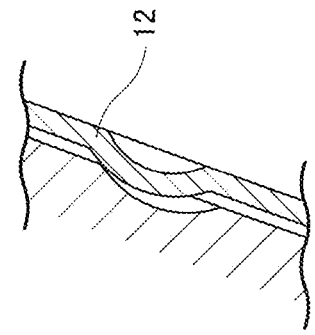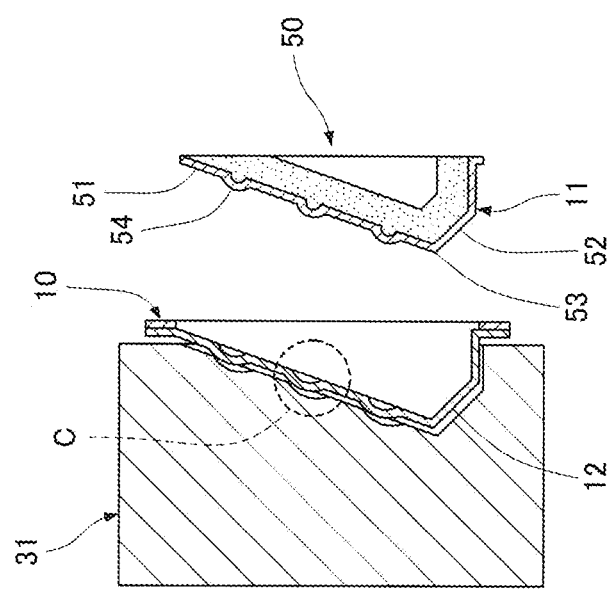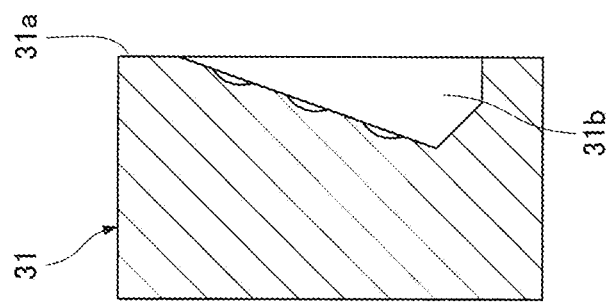

F I G. 4 D
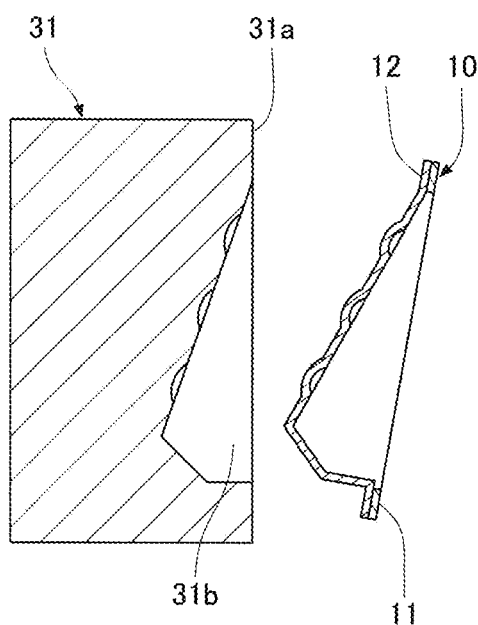

F I G. 5D
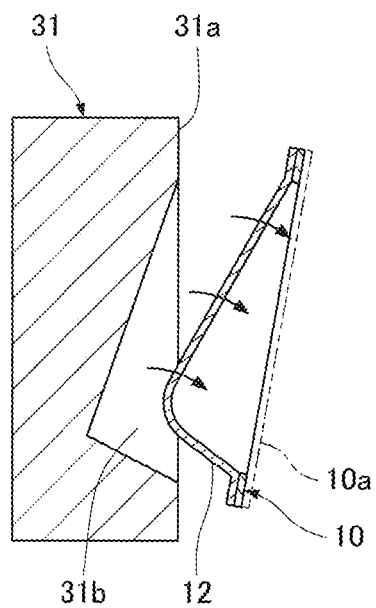
F I G. 5E
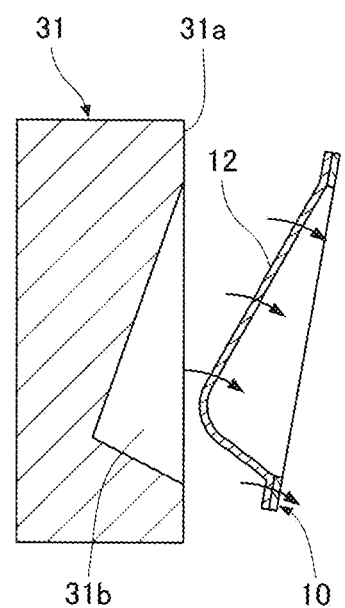

F I G. 6 A
F I G. 6 B
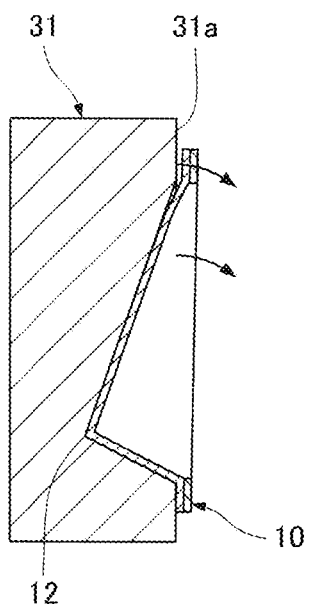
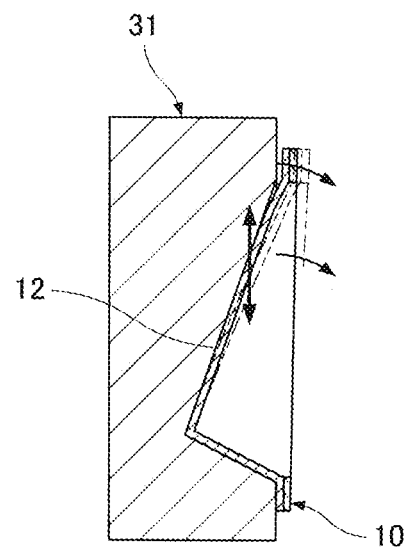

INJECTION MOLDING METHOD AND INJECTION MOLDING MACHINE

FIELD OF THE INVENTION

The present invention relates to an injection molding method and an injection molding machine that transfer a transfer film, e.g., a decorative film or a functional film to the surface of a molded article while injection-molding the molded article.

BACKGROUND OF THE INVENTION

In a known injection molding process, a transfer film, e.g., a decorative film or a functional film is transferred to a molded article during injection molding. The injection molding process typically has the following steps:

First, a film including a base film and a transfer film, e.g., a decorative film or a functional film stacked on the base film is fed between a first die and a second die, which are shaping dies constituting a mold, from the upstream side of the dies. At this point, tension is applied to the film having a flat surface. The surface of the film interposed between the first die and the second die is disposed in parallel with a mold parting face that is the parting face of the first die.

Subsequently, the film is fixed to the parting face of the first die with a clamping tool. After that, the film is sucked to a molding surface that is the inner surface of the recessed portion of the first die. This stretches the film along the molding surface of the first die as much as possible.

Subsequently, the second die is moved to the first die so as to close the mold composed of the first die and the second die. At this point, the first and second dies and the clamping tool come into contact with each other, forming a cavity having a predetermined shape.

After that, a predetermined amount of molten resin is injected into the cavity having the predetermined shape in the closed mold. The injected molten resin is then cooled. This solidifies the resin into a molded article having the predetermined shape. Through this process, the transfer film stacked on the base film is transferred to the surface of the molded article.

After a certain cooling period, the second die is separated from the first die so as to open the mold composed of the first and second dies. The molded article is then removed from the opened mold. After the removal of the molded article, the clamping tool is separated from the parting face of the first die and then the film is transported downstream of the mold, separating the base film from the recessed portion of the first die.

The film is rolled on a shaft in a film feeder disposed upstream of the mold. The film drawn from the film feeder is looped over a shaft in a film winder disposed downstream of the mold. When the rolled film fed from the film feeder is wound by the film winder, the shaft in the film feeder and the shaft in the film winder are rotated by different motors so as to apply predetermined tension to the film.

As has been discussed, the film including the transfer film, e.g., a decorative film or a functional film stacked on the base film is inserted between the first and second dies that are shaping dies for injection molding of resin materials, and then the shaping dies are closed. Subsequently, molten resin is injected onto the film contained in the shaping dies so as to transfer the transfer film, e.g., a decorative film or a functional film onto a molded article while molding the injection molded article with high accuracy.

For example, Japanese Patent Laid-Open No. 7-60791 describes an example of the injection molding process. Japanese Patent Laid-Open No. 7-60791 describes an injection molding method and an injection molding machine which transfer a decorative film, that is, a pattern to the surface of a molded article while injection-molding the molded article by means of a film including the decorative film stacked with the printed pattern on a base film. FIG. 8 is a cross-sectional view of the injection molding machine described in Japanese Patent Laid-Open No. 7-60791.

In the injection molding machine of FIG. 8, first, a film 100 including a decorative film stacked with a printed pattern on a base film is caused to travel between a first die 201 and a second die 202, and then the pattern is positioned between the first die 201 and the second die 202.

Subsequently, in the injection molding machine of FIG. 8, the film 100 is fixed on the parting face of the first die 201 with a clamping tool 203 and then is sucked on a molding surface that is the inner surface of the recessed portion of the first die 201. This stretches the film 100 along the molding surface of the first die 201 as much as possible.

After that, in the injection molding machine of FIG. 8, a mold composed of the first die 201 and the second die 202 is closed, and then molten resin is injected into a cavity 204 formed in the closed mold. The injected molten resin is then cooled in the injection molding machine of FIG. 8. Thus, the resin is solidified into a molded article 300. Furthermore, a pattern is transferred to the surface of the molded article 300 through this process.

Subsequently, in the injection molding machine of FIG. 8, the mold composed of the first die 201 and the second die 202 is opened and then the molded article 300 is removed from the opened mold. After that, in the injection molding machine of FIG. 8, the clamping tool 203 is separated from the parting face of the first die 201 and then the film 100 is wound on a shaft in a film winder (not shown). This separates the base film from the recessed portion of the first die 201 and feeds the film 100 downstream of the mold.

Also in the injection molding machine of FIG. 8, tension is applied to the film 100 traveling between the first die 201 and the second die 202, flattening the surface of the film 100 in parallel with a mold parting surface that is the parting surface of the first die 201.

As has been discussed, typically, the film is fixed to the parting surface of the first die with the clamping tool and then is drawn into the recessed portion of the first die by suction before molten resin is injected. Thus, the film is partially stretched.

DISCLOSURE OF THE INVENTION

In the typical injection molding process, however, if the molded article has a deeply drawn shape, the base film may be stretched beyond its elastic limit and locally have an extremely small thickness. This is because the film is stretched along the recessed portion of the first die by suction as much as possible and then the film is stretched into contact with the inner surface of the recessed portion of the first die by the injection pressure of the resin. Hence, when the base film is removed from the recessed portion of the first die after the mold is opened, a rapid force applied to the film may cause an impact force exceeding the critical stress on an extremely thin portion of the base film. Thus, the base film may be broken with fragments scattered in the mold. Such fragments may become foreign matters causing failures in the subsequent injection molding. When the base film is peeled from the recessed portion of the first die after the mold is opened, adhesion caused by static electricity between the first die and the base film may apply a stress exceeding the critical stress on a thin portion of the base film, leading to a break on the base film. For example, failures are caused by foreign matters such as fragments of the base film in the molded article.

As has been discussed, the base film stretched according to the recessed shape of the first die may have foreign matters causing failures. Moreover, a break on the base film may cause variations in tension in the film when the film is wound up. This may lead to a displacement of winding or a pattern on the film and deteriorate the positioning accuracy of the film. Hence, a break on the base film may deteriorate the appearance of the molded article. In the case where the transfer film is partially stacked on the base film, that is, the transfer film is discontinuously stacked in the longitudinal direction of the base film, the transfer film on the base film needs to be located at a proper position between the first die and the second die at each time of injection molding. This requires the film to be positioned with high accuracy.

An object of the present invention is to provide an injection molding method and an injection molding machine that hardly break a base film when the base film is separated from the recessed portion of a first die after a mold is opened.

An aspect of an injection molding method according to the present invention includes the steps of: causing a long film to travel between a first die and a second die while applying tension to the film including a base film, and positioning the film between the first die and the second die, the film having a surface tilted with respect to the parting face of the first die; closing the first die and the second die; forming a molded article with a transfer film by injecting resin into a cavity formed by the first die and the second die that hold a part of the film, the transfer film being transferred from the base film; opening the first die and the second die; and separating the base film from the first die so as to tilt the surface of the film with respect to the parting face of the first die.

Another aspect of the injection molding method according to the present invention, wherein tension is applied to the film when the base film is separated from the first die.

Another aspect of the injection molding method according to the present invention, wherein tension applied to the film gradually increases in multiple steps when the base film is separated from the first die.

Another aspect of the injection molding method according to the present invention, wherein the film slightly moves back and forth widthwise when the base film is separated from the first die.

Another aspect of the injection molding method according to the present invention, wherein tension is applied to the film and the film is released from the tension in an alternating manner when the base film is separated from the first die.

An aspect of an injection molding machine according to the present invention includes:

a molding unit including a first die and a second die with a long film traveling between the first die and the second die, the film including a base film, the molding unit closing the first die and the second die when the film is positioned between the first die and the second die, forming a molded article with a transfer film by injecting resin into a cavity formed by the first die and the second die that hold a part of the film, and then opening the first die and the second die, the transfer film being transferred from the base film; and a film feeder including a feeding unit that feeds the film and a winding unit that winds up the film fed from the feeding unit, the film feeder causing the film to travel between the first die and the second die while applying tension to the film having a surface tilted with respect to the parting face of the first die, wherein after the first die and the second die are opened, the film feeder separates the base film from the first die so as to tilt the surface of the film with respect to the parting face of the first die.

Another aspect of the injection molding machine according to the present invention, wherein the feeding unit includes a feeding shaft that determines a feed amount of the film, and a feeding pinch roller capable of pressing the film to the feeding shaft such that the film travels in response to a rotation of the feeding shaft, and the winding unit includes a drawing shaft that determines tension applied to the film, and a drawing pinch roller capable of pressing the film to the drawing shaft such that the film travels in response to a rotation of the drawing shaft.

According to the present invention, after the dies are opened, the base film separated from the first die is hardly broken. Thus, fragments of the base film can be reduced so as to lower the occurrence of failures caused by foreign matters. Moreover, the present invention can improve the positioning accuracy of the film and the appearance of the molded article.

BRIEF DESCRIPTION OF THE DRAWINGS

FIG. 1 is a perspective view schematically illustrating the configuration of an injection molding machine according to an embodiment of the present invention;

FIG. 2A is a cross-sectional view for schematically explaining an example of the operation of the injection molding machine according to the embodiment of the present invention;

FIG. 2B is a cross-sectional view for schematically explaining the example of the operation of the injection molding machine according to the embodiment of the present invention;

FIG. 2G is a cross-sectional view for schematically explaining the example of the operation of the injection molding machine according to the embodiment of the present invention;

FIG. 4A is a cross-sectional view schematically illustrating a first die according to the embodiment of the present invention;

FIG. 4B is a cross-sectional view schematically illustrating a base film separated from the recessed portion of the first die after injection molding according to the embodiment of the present invention;

FIG. 4C is an enlarged view of part C of FIG. 4B;

FIG. 4D is a cross-sectional view schematically illustrating an example of the shape of the base film after injection molding according to the embodiment of the present invention;

FIG. 5D is a cross-sectional view for schematically illustrating the example of the operation of the base film after injection molding according to the embodiment of the present invention;

FIG. 5E is a cross-sectional view for schematically illustrating the example of the operation of the base film after injection molding according to the embodiment of the present invention;

FIG. 6A is a cross-sectional view for schematically illustrating another example of the operation of the base film after injection molding according to the embodiment of the present invention;

FIG. 6B is a cross-sectional view for schematically illustrating the other example of the operation of the base film after injection molding according to the embodiment of the present invention;

DESCRIPTION OF THE EMBODIMENTS

Figure 2C:
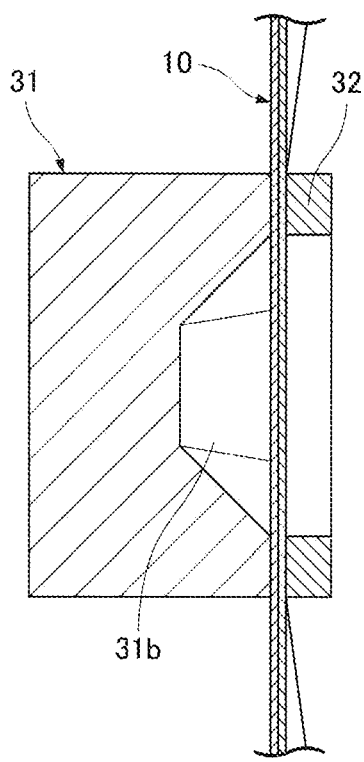
FIG. 2C is a cross-sectional view for schematically explaining the example of the operation of the injection molding machine according to the embodiment of the present invention.

An embodiment of the present invention will be described below with reference to the accompanying drawings. The same constituent elements are indicated by the same reference numerals and the explanation thereof may be omitted. To enhance understanding, the schematic drawings mainly illustrate the constituent elements. The actual thicknesses, lengths, and so on of the constituent elements are different from those of the illustrated constituent elements for the purpose of creation of the drawings. The shapes of the illustrated constituent elements are merely exemplary and are not particularly limited. Moreover, numeral values such as tension in the embodiment are merely exemplary and are not particularly limited.

FIG. 1 is a perspective view schematically illustrating the configuration of an injection molding machine according to the embodiment of the present invention. As shown in FIG. 1, the injection molding machine of the present embodiment is provided with a film feeder including a film feeding unit 20 that feeds a film 10, and a film winding unit 40 that winds up the film 10. The injection molding machine of the present embodiment is further provided with a molding unit 30 including a first die 31 and a second die (not shown) that constitute a mold as a shaping die. The molding unit 30 holds the film 10 between the first die 31 and the second die (not shown) after the film 10 is fed from the film feeding unit 20. Molten resin is injected onto the held film 10 so as to form a molded article by injection molding; meanwhile, the film 10 is partially transferred to the surface of the molded article. The film feeding unit 20 includes a feeding shaft 21 having a roll of the film 10. The film 10 wound around the feeding shaft 21 passes through the molding unit 30 and is looped over a winding shaft 41 included in the film winding unit 40.

The present embodiment will describe an injection molding method and the injection molding machine in which a pattern (decorative film) is transferred to the surface of an injection molded article during the injection molding of the molded article by means of the film 10 including the decorative film stacked with the printed pattern on a base film. The present invention is also applicable to an injection molding method and an injection molding machine in which a transfer film other than a decorative film such as a functional film is transferred to the surface of an injection molded article during the injection molding of the molded article.

The film feeding unit 20 includes, in addition to the feeding shaft 21 for feeding the film 10, a feeding shaft 22 that determines a feed amount of the film 10 and a feeding pinch roller 23 capable of pressing the film 10 to the feeding shaft 22 in response to the rotations of the feeding shaft 22.

The feeding shaft 22 is rotated by a motor (not shown). The motor for rotating the feeding shaft 22 is a motor capable of controlling an amount of rotation. The feeding shaft 22 feeds the film 10 between the feeding shaft 22 and the feeding pinch roller 23 by a predetermined amount of rotation. Thus, the film 10 is fed from the film feeding unit 20 by a predetermined feed amount in response to the rotations of the feeding shaft 22.

The feeding shaft 21 is also rotated by a motor (not shown). When the film 10 fed from the film feeding unit 20 is wound up in the film winding unit 40, the motor for rotating the feeding shaft 21 rotates the feeding shaft 21 so as to feed the film 10 by a feed amount determined by the feeding shaft 22, winding up the film 10 around the feeding shaft 21.

The feeding pinch roller 23 can separate from or approach the feeding shaft 22. When the film 10 fed from the film feeding unit 20 is wound up in the film winding unit 40, the feeding pinch roller 23 approaches the feeding shaft 22 and holds the film 10 with the feeding shaft 22. The feeding pinch roller 23 can be separated from or brought closer to the feeding shaft 22 by, for example, a mechanism including a motor and a cam.

The film winding unit 40 includes, in addition to the winding shaft 41 for winding up the film 10, a drawing shaft 42 that determines tension applied to the film 10, and a drawing pinch roller 43 that can press the film 10 to the drawing shaft 42 in response to the rotations of the drawing shaft 42.

The drawing shaft 42 is rotated by a motor (not shown). The motor for rotating the drawing shaft 42 is a motor capable of controlling torque. The drawing shaft 42 draws the film 10 between the drawing shaft 42 and the drawing pinch roller 43 with predetermined torque. Thus, the rotations of the drawing shaft 42 apply predetermined tension to the film 10 drawn into the film winding unit 40.

The winding shaft 41 is also rotated by a motor (not shown). When the film 10 fed from the film feeding unit 20 is wound up in the film winding unit 40, the motor for rotating the winding shaft 41 rotates the winding shaft 41 so as to feed the film 10 by a feed amount determined by the feeding shaft 22, winding up the film 10 around the winding shaft 41.

The drawing pinch roller 43 can separate from or approach the drawing shaft 42. When the film 10 fed from the film feeding unit 20 is wound up in the film winding unit 40, the drawing pinch roller 43 approaches the drawing shaft 42 and holds the film 10 with the drawing shaft 42. The drawing pinch roller 43 can be separated from or brought closer to the drawing shaft 42 by, for example, a mechanism including a motor and a cam.

The injection molding machine may include a tension measuring device (not shown) that measures tension applied to the film 10, the tension being measured to restore a printed pattern on the decorative film of the film 10 to the surface of the molded article with a printed pattern shape and size, and a feedback circuit (not shown) that adjusts the output (torque) of the motor for rotating the drawing shaft 42, the output being adjusted according to the tension measured by the tension measuring device so as to apply predetermined tension to the film 10. Thus, when a pattern is positioned between the first die 31 and the second die (not shown), the predetermined tension is applied to the film 10 so as to transfer a smooth pattern to the surface of the molded article with a printed pattern shape and size.

The molding unit 30 includes, in addition to the first die 31 and the second die (not shown), a clamping tool 32 that fixes the film 10 to a parting face 31a of the first die 31 after the film 10 is fed from the film feeding unit 20, and a suction mechanism (not shown) that sucks the film 10 to the inner surface (molding surface) of a recessed portion 31b formed on the first die 31, the film 10 being fixed with the clamping tool 32.

When the film 10 is fixed to the first die 31 by the clamping tool 32 and the suction mechanism (not shown), the molding unit 30 moves the second die (not shown) to the first die 31 and holds the film 10 between the first die 31 and the second die, closing the mold composed of the first die 31 and the second die. At this point, the first die 31, the second die, and the clamping tool 32 come into contact with one another so as to form a cavity having a predetermined shape in the mold. After the mold is closed, the molding unit 30 injects a predetermined amount of molten resin into the formed cavity having the predetermined shape in the closed mold. The molding unit 30 then cools the injected molten resin. This solidifies the resin in the cavity into a molded article having a predetermined shape. In this process, the decorative film (pattern) is transferred to the surface of the molded article.

Operations in injection molding of the injection molding machine according to the present embodiment will be specifically described below. FIGS. 2A to 2G are cross-sectional views schematically illustrating an example of the operation of the injection molding machine according to the present embodiment. The principal part of the injection molding machine is viewed from one side of the molding unit 30. FIGS. 3A to 3G are cross-sectional views schematically illustrating an example of the operation of the injection molding machine according to the present embodiment. The same operations as in FIGS. 2A to 2G are viewed in the traveling direction of the film 10 (from the ceiling of the first die 31).

As shown in FIG. 2A, the long film 10 passes between the first die 31 and the clamping tool 32 from the film feeding unit 20 and is looped over the film winding unit 40. In the step of FIGS. 2A and 3A, the long film 10 held between the feeding shaft 22 and the feeding pinch roller 23 is fed from the film feeding unit 20; meanwhile, in the film winding unit 40, the film 10 held between the drawing shaft 42 and the drawing pinch roller 43 is wound around the winding shaft 41. At this point, the film 10 is fed by the feeding shaft 22 by a predetermined amount such that a predetermined pattern is supplied to a predetermined position in the range of the recessed portion 31b of the first die 31 and then is positioned thereon. Moreover, predetermined tension is applied to the film 10 at that time by the output (torque) of the motor for driving the drawing shaft 42. As shown in FIG. 3A, the film 10 at that time travels with a tilted surface (plane) with respect to the parting face 31a of the first die 31.

In the present embodiment, as shown in FIG. 3A, the bottom of the recessed portion 31b of the first die 31 is tilted when viewed in the traveling direction of the film 10 (from the ceiling of the first die 31). In this case, the film 10 is preferably tilted such that a distance between the film 10 and the parting face 31a of the first die 31 decreases toward a larger depth of the recessed portion 31b (a larger depth of the molded article) of the first die 31 while a distance between the film 10 and the parting face 31a of the first die 31 increases toward a smaller depth of the recessed portion 31b of the first die 31 (a smaller depth of the molded article). The present invention is also applicable not only to a molded article having an uneven depth but also to a molded article having a constant depth. In the present embodiment, the molded article deeply drawn with a maximum depth of at least 1 mm is injection molded.

Figure 3A:
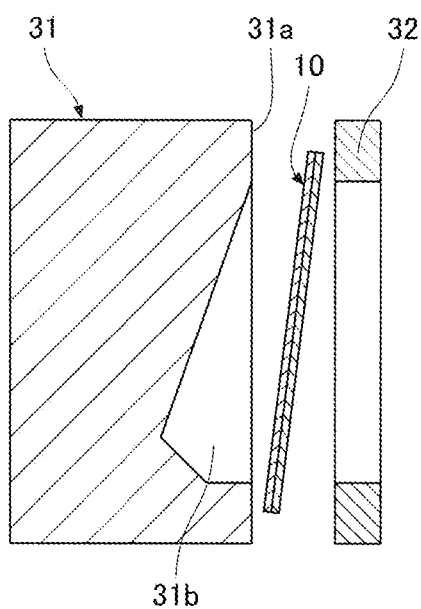
FIG. 3A is a cross-sectional view for schematically explaining an example of the operation of the injection molding machine according to the embodiment of the present invention.
Figure 3B:
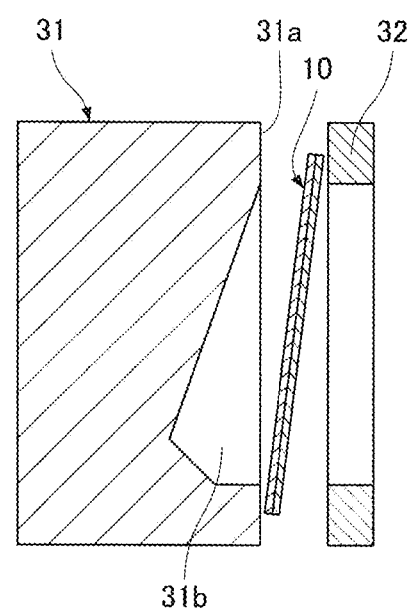
FIG. 3B is a cross-sectional view for schematically explaining the example of the operation of the injection molding machine according to the embodiment of the present invention.

In the step of FIGS. 2B and 3B, the feeding pinch roller 23 is separated from the feeding shaft 22, the drawing pinch roller 43 is separated from the drawing shaft 42, and the operation of the motor (not shown) for driving the drawing shaft 42 is stopped. Thus, the film 10 is released from tension.

Figure 3C:
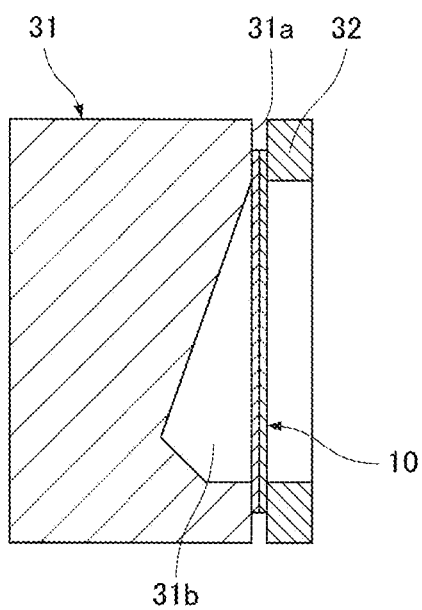
FIG. 3C is a cross-sectional view for schematically explaining the example of the operation of the injection molding machine according to the embodiment of the present invention.

In the step of FIGS. 2C and 3C, the clamping tool 32 presses the film 10 to the parting face 31a of the first die 31. After the clamping tool 32 presses the film 10 to the parting face 31a of the first die 31, the film 10 may be released from tension.

Figure 2D:
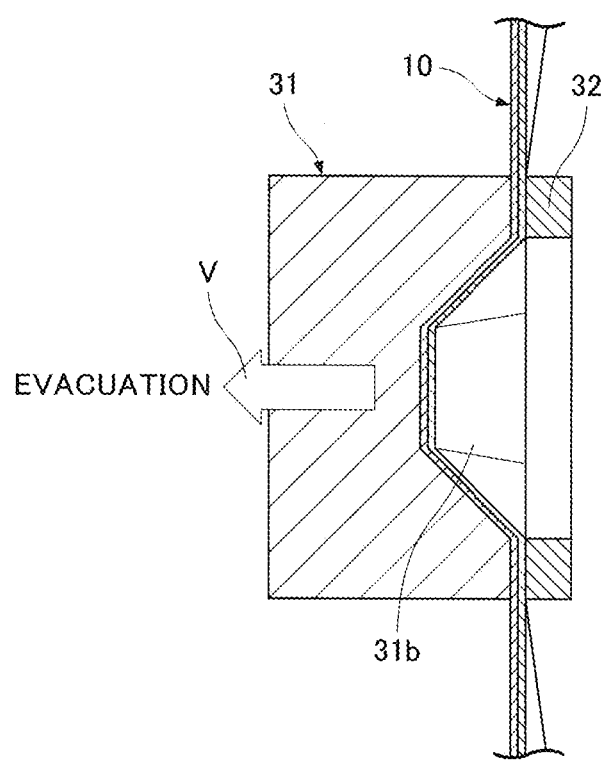
FIG. 2D is a cross-sectional view for schematically explaining the example of the operation of the injection molding machine according to the embodiment of the present invention.
Figure 3D:
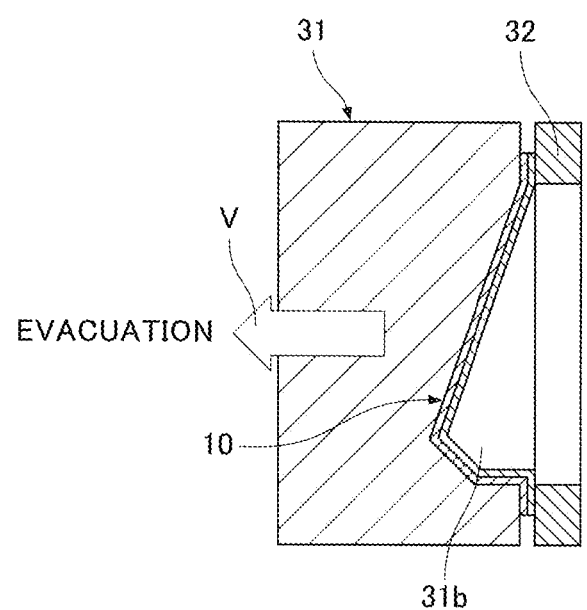
FIG. 3D is a cross-sectional view for schematically explaining the example of the operation of the injection molding machine according to the embodiment of the present invention.

In the step of FIGS. 2D and 3D, as indicated by arrow V, a space surrounded by the film 10 and the recessed portion 31b of the first die 31 is evacuated from a suction port (not shown) opened on the first die 31. Thus, the film 10 is sucked and fixed to the recessed portion 31b of the first die 31. Meanwhile, the film 10 is pressed to the parting face 31a of the first die 31 by the clamping tool 32. This allows the film 10 to be locally stretched in the frame of the clamping tool 32 in or substantially in contact with the recessed portion 31*b* of the first die 31. When the film 10 is sucked and fixed to the first die 31, the film 10 may be drawn from the outside of the clamping tool 32 to the recessed portion 31*b* of the first die 31. Thus, the stretched and thinned film 10 is unlikely to be broken. For example, on the frame of the clamping tool 32, a surface near the parting face 31*a* along a side orthogonal to the feeding direction of the film 10 may have a stepped elastic body made of a material having a smaller modulus of elasticity than the clamping tool 32 such that a thin portion of the elastic body is disposed near the recessed portion 31*b*. This configuration reduces a force pressing the film 10 to the parting face 31*a* of the first die 31 at a position corresponding to a stepped portion of the elastic body. The force pressing the film 10 to the parting face 31*a* of the first die 31 with the clamping tool 32 partially decreases, drawing the film 10 to the recessed portion 31*b* of the first die 31 from the outside of the clamping tool 32.

Figure 2F:
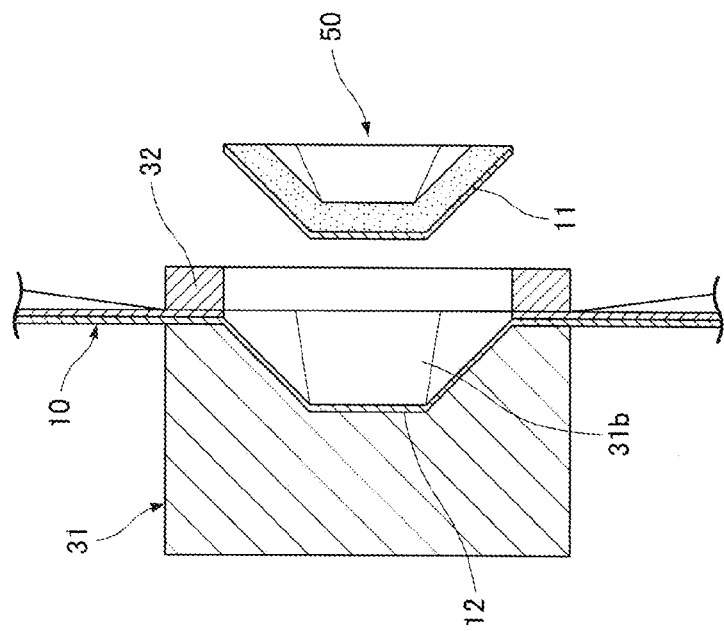
FIG. 2F is a cross-sectional view for schematically explaining the example of the operation of the injection molding machine according to the embodiment of the present invention.
Figure 2E:
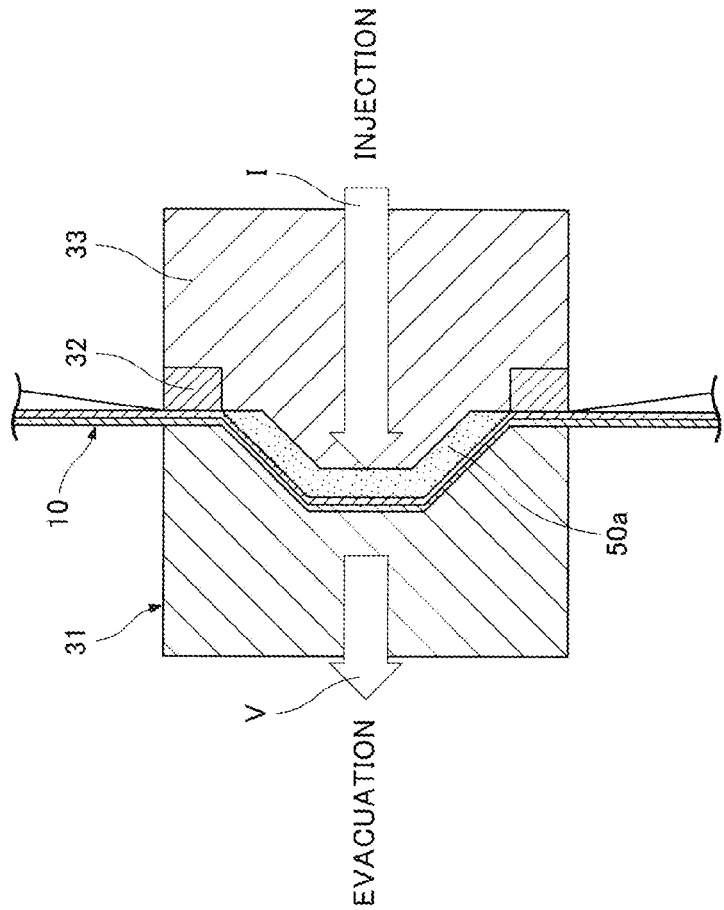
FIG. 2E is a cross-sectional view for schematically explaining the example of the operation of the injection molding machine according to the embodiment of the present invention.
Figure 3F:
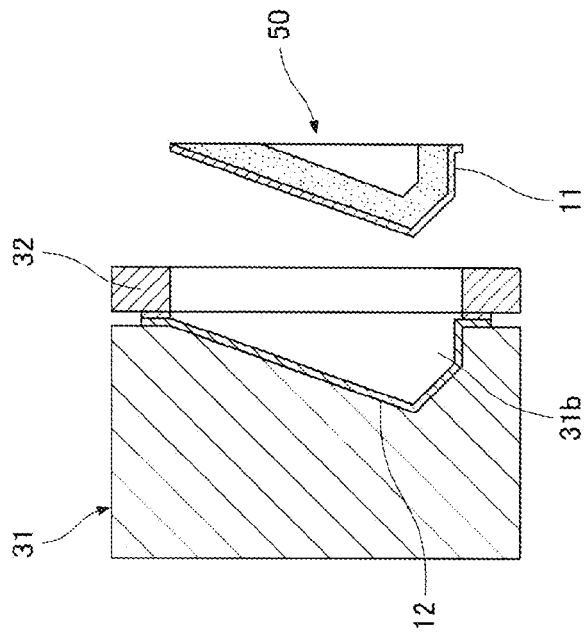
FIG. 3F is a cross-sectional view for schematically explaining the example of the operation of the injection molding machine according to the embodiment of the present invention.
Figure 3E:
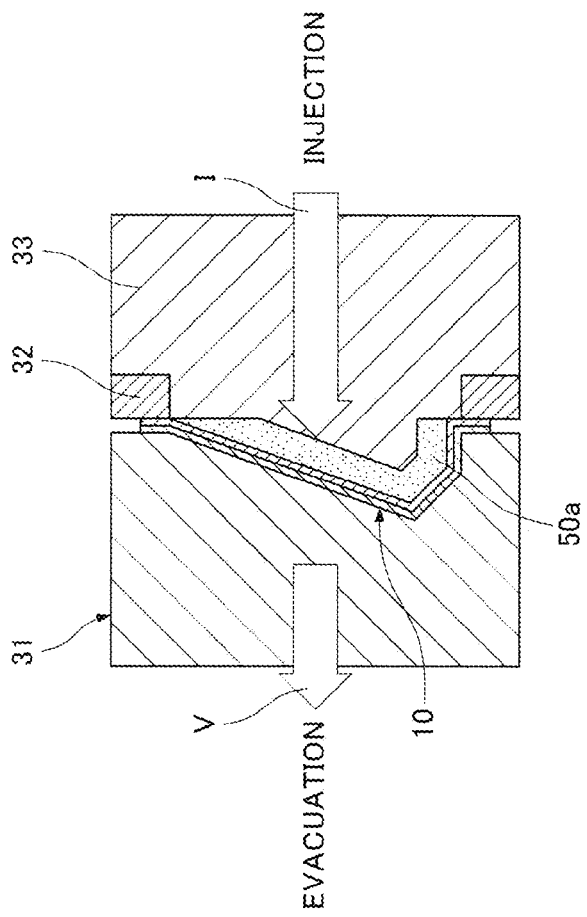
FIG. 3E is a cross-sectional view for schematically explaining the example of the operation of the injection molding machine according to the embodiment of the present invention.

In the step of FIGS. 2E and 3E, a second die 33 is closed so as to close the mold composed of the first die 31 and the second die 33, and then a molding step is performed. In the molding step, a predetermined amount of molten resin 50*a* is injected into the cavity in the closed mold as indicated by arrow I, and then processes such as a dwelling process and a cooling process are performed.

In the step of FIGS. 2F and 3F, the second die 33 is opened to remove a molded article 50 from the mold after the completion of the molding step. A decorative film (pattern) 11 is transferred to the surface of the removed molded article 50.

Figure 3G:
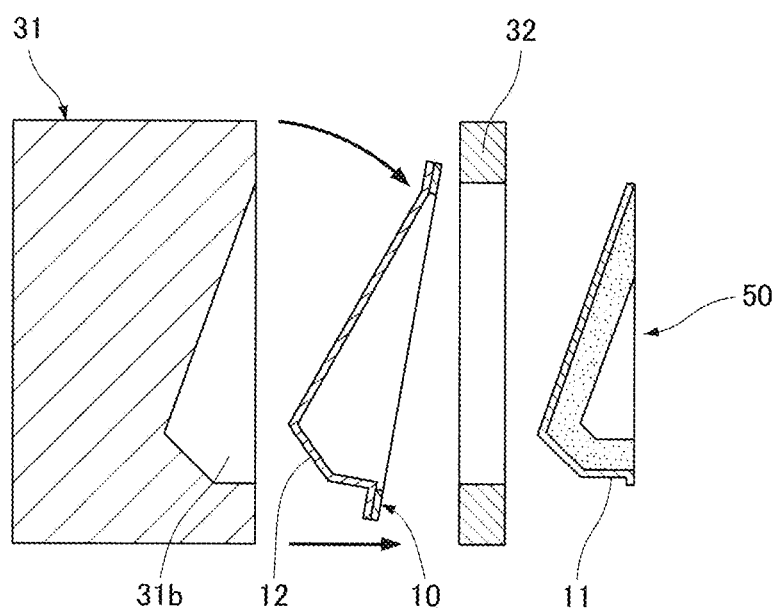
FIG. 3G is a cross-sectional view for schematically explaining the example of the operation of the injection molding machine according to the embodiment of the present invention.

In the step of FIGS. 2G and 3G, the clamping tool 32 is separated from the parting face 31*a* of the first die 31, the feeding pinch roller 23 approaches the feeding shaft 22 and holds the film 10 with the feeding shaft 22, and the drawing pinch roller 43 approaches the drawing shaft 42 and holds the film 10 with the drawing shaft 42. After that, the motor (not shown) driving the drawing shaft 42 applies tension to the film 10, and then the tension separates a base film 12 from the recessed portion 31*b* of the first die 31.

After the process returns to the step of FIGS. 2A and 3A, the film 10 is wound around the winding shaft 41 of the film winding unit 40. The film 10 traveling between the first die 31 and the clamping tool 32 positions a predetermined pattern, which is used for the subsequent injection molding, at a predetermined position in the range of the recessed portion 31*b* of the first die 31.

Referring to FIGS. 4A to 4D, the locally stretched base film 12 will be described below. FIGS. 4A to 4D are cross-sectional views for explaining the shape of the base film 12 stretched along the recessed portion 31*b* of the first die 31. Specifically, FIG. 4A is a cross-sectional view schematically illustrating the first die 31. The first die 31 is viewed in the traveling direction of the film 10 (from the ceiling of the first die 31). FIG. 4B is a cross-sectional view schematically illustrating the base film 12 separated from the recessed portion 31*b* of the first die 31 after injection molding. The first die 31 is viewed in the traveling direction of the film 10 (from the ceiling of the first die 31). FIG. 4C is an enlarged view of part C of FIG. 4B. FIG. 4D is a cross-sectional view schematically illustrating the base film 12 separated from the recessed portion 31*b* of the first die 31 after injection molding.

In the case of a molded article having a deeply drawn shape, the base film stretched along the recessed portion of the first die decreases in thickness particularly at a deep bent portion of the recessed portion. In the present embodiment, as shown in FIG. 4B, the molded article 50 is deeply drawn. The surface of the molded article 50 has a slightly tilted portion 51 and a largely tilted portion 52. Hence, the base film 12 stretches and thins particularly at a point corresponding to a portion 53 connecting the slightly tilted portion 51 and the largely tilted portion 52. As shown in FIG. 4B, in the case where small irregularities 54, e.g., grain are formed on the surface of the molded article 50, the base film 12 is stretched and thinned particularly at a point corresponding to the small irregularities 54 as shown in FIG. 4C. If the base film 12 partially has an extremely small thickness, when the base film 12 is removed from the recessed portion 31*b* of the first die 31 after the mold is opened, a force rapidly applied to the base film 12 may cause an impact force applied to the extremely thin portion of the base film 12 to exceed a critical stress so as to break the base film 12. Since the base film 12 is stretched beyond an elastic limit in the recessed portion 31*b* of the first die 31, as shown in FIG. 4D, the base film 12 is separated from the recessed portion 31*b* of the first die 31 after injection molding such that a portion of the base film 12 corresponding to the recessed portion 31*b* of the first die 31 cannot return to an original planar shape.

Referring to FIGS. 5A to 5E, the following will describe the operation of the injection molding machine when the base film 12 is separated from the first die 31 after injection molding. FIGS. 5A to 5E are cross-sectional views schematically illustrating an example of the operation of the base film 12 after injection molding. The first die 31 is viewed in the traveling direction of the film 10 (from the ceiling of the first die 31). In FIGS. 5A to 5E, a virtual line 10*a* indicates a position of the film 10 (film traveling position) that is fed from the film feeding unit 20 and is wound up in the film winding unit 40 so as to travel between the first die 31 and the clamping tool 32. As has been discussed, the film 10 travels with the surface (plane) tilted with respect to the parting face 31*a* of the first die 31.

Figure 5A:
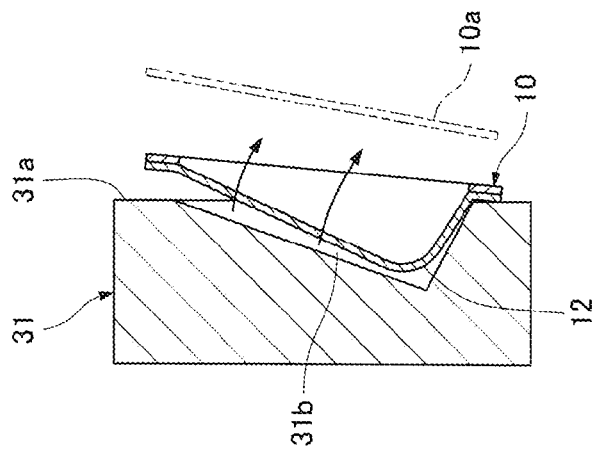
FIG. 5A is a cross-sectional view for schematically illustrating an example of the operation of the base film after injection molding according to the embodiment of the present invention.

FIG. 5A illustrates the base film 12 after the molded article is removed from the mold and the clamping tool is separated from the parting face 31*a* of the first die 31. At this point, the base film 12 is in contact with the recessed portion 31*b* of the first die 31.

Figure 5B:
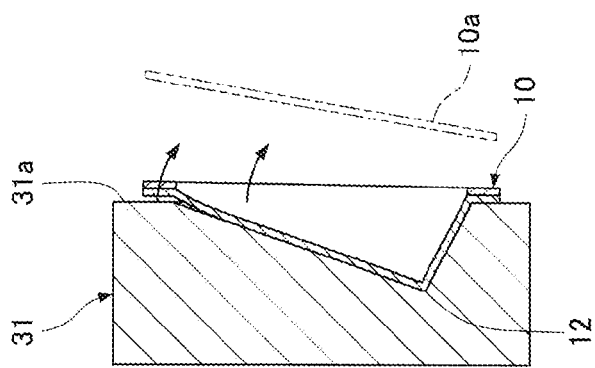
FIG. 5B is a cross-sectional view for schematically illustrating the example of the operation of the base film after injection molding according to the embodiment of the present invention.

After the clamping tool is separated from the parting face 31*a* of the first die 31, tension is applied to the film 10. Thus, as shown in FIG. 5B, one side of the base film 12 with a large distance between the parting face 31*a* of the first die 31 and the film traveling position 10*a* starts separating from the recessed portion 31*b* of the first die 31 toward the film traveling position 10*a*. At this point, low tension of about 0.1 kN to 1 kN may be applied to the film 10.

Figure 5C:
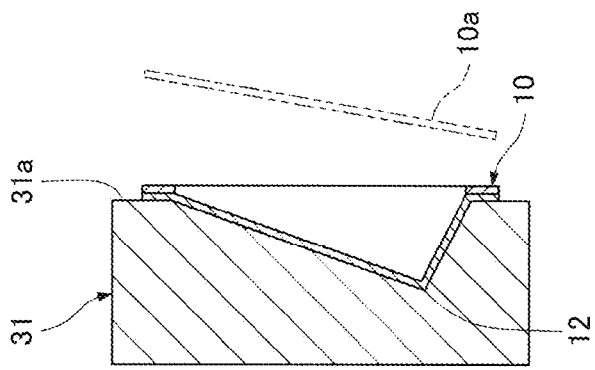
FIG. 5C is a cross-sectional view for schematically illustrating the example of the operation of the base film after injection molding according to the embodiment of the present invention.

After that, the base film 12 gradually separates from the recessed portion 31*b* of the first die 31 to another side with a small distance between the parting face 31*a* of the first die 31 and the film traveling position 10*a*. FIG. 5C illustrates the base film 12 separated from the recessed portion 31*b* of the first die 31 up to the deepest point of the recessed portion 31*b* of the first die 31.

When the base film 12 in contact with the recessed portion 31*b* of the first die 31 is peeled from the recessed portion 31*b* of the first die 31, the base film 12 is fixed on the inner surface (molding surface) of the recessed portion 31*b* of the first die 31 by static electricity. According to the present embodiment, the base film 12 is peeled from the end of the recessed portion 31*b* of the first die 31 and thus can be peeled off with a small force on the end of the recessed portion 31*b* of the first die 31. When the base film 12 is peeled on the end of the recessed portion 31*b* of the first die 31 so as to form a clearance between the recessed portion 31*b* of the first die 31 and the base film 12, a force of attraction caused by static electricity between the inner surface of the recessed portion 31*b* and the base film 12 decreases on the end of the recessed portion 31*b*.

Thus, the base film 12 can be peeled off with a small force thereafter from the end of an interface between the inner surface of the recessed portion 31b and the base film 12 fixed to the inner surface. This can gradually separate the base film 12 in a continuous manner from the inner surface of the recessed portion 31b with small tension of, e.g., about 0.1 kN to 1 kN, starting from the end of the recessed portion 31b of the first die 31. Hence, the base film 12 is hardly broken by static electricity.

The base film 12 is gradually separated from the end of the recessed portion 31b of the first die 31 and thus is slowly peeled from the recessed portion 31b of the first die 31. Hence, as illustrated in FIGS. 4A to 4D, even if the base film 12 has a locally thin portion, an impact force applied to the thin portion is unlikely to reach the critical stress of the base film 12, reducing the occurrence of breaks on the base film 12. Since the base film 12 is separated from the recessed portion 31b of the first die 31 with small tension of about 0.1 kN to 1 kN, the occurrence of breaks on the base film 12 can be further reduced.

Subsequently, the tension applied to the film 10 increases to about 1 kN to 3 kN so as to completely separate the base film 12 from the recessed portion 31b of the first die 31 as shown in FIG. 5D. Consequently, the base film 12 can be separated from the recessed portion 31b of the first die 31 in a shorter time.

Finally, the tension applied to the film 10 returns to tension applied to the film 10 traveling between the first die 31 and the clamping tool 32, e.g., about 3 kN to 8 kN. This can return the film 10 to the film traveling position 10a and the film 10 travels between the first die 31 and the clamping tool 32.

As has been discussed, the shafts 21 and 22 of the film feeding unit 20, the first die 31, the clamping tool 32, and the second die 33 of the molding unit 30, and the shafts 41 and 42 of the film winding unit 40 are disposed such that the film 10 travels between the first die 31 and the clamping tool 32 with the surface (plane) tilted with respect to the parting face 31a of the first die 31. This reduces the occurrence of breaks on the base film 12 when the base film 12 is peeled from the first die 31. Thus, the film 10 traveling after injection molding is unlikely to vary in tension and thus is hardly displaced during winding or hardly displaces the subsequent pattern. Since the base film 12 is hardly broken, foreign matters hardly occur. This reduces failures caused by foreign matters in the molded article. When the base film 12 is separated from the recessed portion 31b of the first die 31 after injection molding, tension applied to the film 10 gradually increases in multiple steps, further reducing the occurrence of breaks on the base film 12.

Alternatively, when the base film 12 is separated from the recessed portion 31b of the first die 31 after injection molding, tension applied to the film 10 may rapidly increase to tension (e.g., about 3 kN to 8 kN) applied to the film 10 traveling between the first die 31 and the clamping tool 32. Also in this case, the base film 12 is gradually separated from the end of the recessed portion 31b of the first die 31, reducing a stress (impact force) applied to the base film 12 separated from the recessed portion 31b of the first die 31. This reduces the occurrence of breaks on the base film 12. Since tension applied to the film 10 gradually increases in multiple steps, an impact force applied to the base film 12 decreases, further reducing the occurrence of breaks on the base film 12. Furthermore, the film 10 more stably returns to the film traveling position 10a.

Referring to FIGS. 6A and 6B, another example of the present embodiment will be described below. FIGS. 6A and 6B are cross-sectional views schematically illustrating another example of the operation of the base film after injection molding according to the present embodiment. The first die 31 is viewed in the traveling direction of the film 10 (from the ceiling of the first die 31). Specifically, FIGS. 6A and 6B show the operation of the base film 12 at the start of application of tension to the film 10. FIG. 6A shows the same state as that of FIG. 5B.

As shown in FIG. 6B, at the start of application of tension (e.g., small tension of about 0.1 kN to 1 kN) to the film 10, the injection molding machine moves the film 10 back and forth widthwise by a small amount of about 1 mm. As has been discussed, when the base film 12 is peeled from the recessed portion 31b of the first die 31, the base film 12 is fixed on the inner surface (molding surface) of the recessed portion 31b of the first die 31 by static electricity. The film 10 slightly moving back and forth widthwise releases the base film 12 from the static fixation, facilitating the separation of the base film 12 from the recessed portion 31b of the first die 31. The film 10 may continue slightly moving back and forth widthwise until the base film 12 is separated from the deepest point of the recessed portion 31b of the first die 31.

Generally, a known film feeder and a known film winder are provided with a moving mechanism for positioning a film widthwise. Thus, the film 10 can be slightly moved back and forth widthwise by the generally known film feeder and the generally known film winder.

Figure 7A:
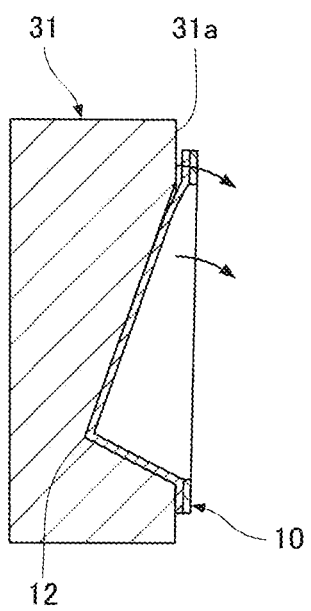
FIG. 7A is a cross-sectional view for schematically illustrating still another example of the operation of the base film after injection molding according to the embodiment of the present invention.
Figure 7B:
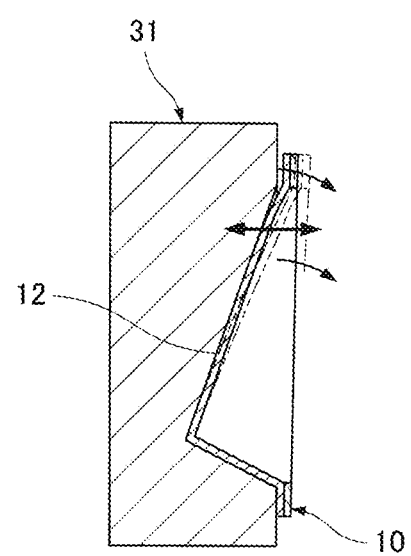
FIG. 7B is a cross-sectional view for schematically illustrating the still other example of the operation of the base film after injection molding according to the embodiment of the present invention.
Figure 8:
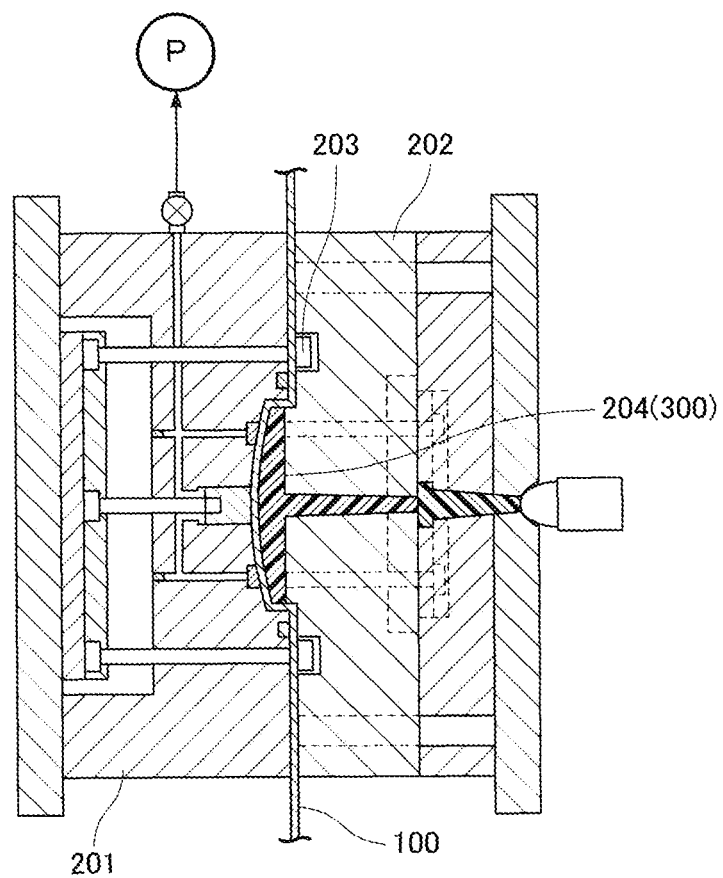
FIG. 8 is a cross-sectional view of an injection molding machine described in Japanese Patent Laid-Open No. 7-60791.

Referring to FIGS. 7A and 7B, still another example of the base film 12 easily separated from the recessed portion 31b of the first die 31 will be described below. FIGS. 7A and 7B are cross-sectional views schematically illustrating still another example of the operation of the base film after injection molding according to the present embodiment. The first die 31 is viewed in the traveling direction of the film 10 (from the ceiling of the first die 31). Specifically, FIGS. 7A and 7B show the operation of the base film 12 at the start of application of tension to the film 10. FIG. 7A shows the same state as that of FIG. 5B.

As shown in FIG. 1, the film feeding unit 20 and the film winding unit 40 respectively include the feeding pinch roller 23 and the drawing pinch roller 43. As shown in FIG. 7B, at the start of application of tension (e.g., small tension of about 0.1 kN to 1 kN) to the film 10, the feeding pinch roller 23 is repeatedly separated from the feeding shaft 22 and brought closer to the feeding shaft 22 to hold the film 10 with the feeding shaft 22 while the drawing pinch roller 43 is repeatedly separated from the drawing shaft 42 and brought closer to the drawing shaft 42 to hold the film 10 with the drawing shaft 42. Thus, tension is applied to the film 10 and the film 10 is released from the tension in an alternating manner, vibrating the film 10 perpendicularly to the surface of the film 10. Hence, the base film 12 is easily separated from the recessed portion 31b of the first die 31 as in the case where the film 10 slightly moves back and forth widthwise.

The film 10 may continue vibrating perpendicularly to the surface of the film 10 until the base film 12 is separated from the deepest point of the recessed portion 31b of the first die 31. The feeding pinch roller 23 may be performed in synchronization with the drawing pinch roller 43 or at a different time from the drawing pinch roller 43. Alternatively, the film 10 vibrating perpendicularly to the surface of the film 10 may be slightly moved back and forth widthwise as shown in FIG. 6B.

As has been discussed, according to the present embodiment, the surface (plane) of the film 10 is tilted with respect to the parting face 31a of the first die 31, reducing a stress (impact force) applied to the base film 12 separated from the recessed portion 31b of the first die 31. Thus, even if the molded article 50 has a deeply drawn shape such that the thin base film 12 is easily broken, the occurrence of breaks on the base film 12 can be reduced. Since the surface (plane) of the film 10 is tilted with respect to the parting face 31a of the first die 31, the base film 12 can be released from fixation between the first die 31 and the base film 12 by static electricity. Hence, the base film 12 is hardly broken by static electricity. Furthermore, when the base film 12 is separated from the recessed portion 31b of the first die 31, a stress applied to the film 10 changes in multiple steps, further reducing the occurrence of breaks on the base film 12. When the base film 12 is separated from the recessed portion 31b of the first die 31, the film 10 slightly moves back and forth widthwise or vibrates perpendicularly to the surface of the film 10, further reducing the occurrence of breaks on the base film 12. Hence, the present embodiment reduces fragments of the base film so as to lower the occurrence of failures caused by foreign matters. Moreover, the present embodiment can improve the positioning accuracy of the film and the appearance of the molded article.

The exemplary embodiment of the present invention was described in detail. A person skilled in the art could easily recognize new teachings of the present invention and various modifications that can be made in the exemplary embodiment without substantially departing from the effect of the present invention. Thus, such modifications are intended to be within the scope of the present invention.

What is claimed is:

1. An injection molding method comprising the steps of:
    causing a long film to travel between a first die and a second die while applying tension to the film including a base film, and positioning the film between the first die and the second die, the film having a surface tilted with respect to a parting face of the first die;
    closing the first die and the second die;
    forming a molded article with a transfer film by injecting resin into a cavity formed by the first die and the second die that hold a part of the film, the transfer film being transferred from the base film;
    opening the first die and the second die; and
    separating the base film from the first die so as to tilt the surface of the film with respect to the parting face of the first die,
    wherein tension applied to the film gradually increases in multiple steps when the base film is separated from the first die.

2. An injection molding method comprising the steps of:
    causing a long film to travel between a first die and a second die while applying tension to the film including a base film, and positioning the film between the first die and the second die, the film having a surface tilted with respect to a parting face of the first die;
    closing the first die and the second die;
    forming a molded article with a transfer film by injecting resin into a cavity formed by the first die and the second die that hold a part of the film, the transfer film being transferred from the base film;
    opening the first die and the second die; and
    separating the base film from the first die so as to tilt the surface of the film with respect to the parting face of the first die,
    wherein the film slightly moves back and forth widthwise when the base film is separated from the first die, or
    tension is applied to the film and the film is released from the tension in an alternating manner when the base film is separated from the first die.

3. An injection molding machine comprising:
    a molding unit including a first die and a second die with a long film traveling between the first die and the second die, the film including a base film, the molding unit closing the first die and the second die when the film is positioned between the first die and the second die, forming a molded article with a transfer film by injecting resin into a cavity formed by the first die and the second die that hold a part of the film, and then opening the first die and the second die, the transfer film being transferred from the base film; and
    a film feeder including a feeding unit that feeds the film and a winding unit that winds up the film fed from the feeding unit, the film feeder causing the film to travel between the first die and the second die while applying tension to the film having a surface tilted with respect to a parting face of the first die,
    wherein after the first die and the second die are opened, the film feeder separates the base film from the first die so as to tilt the surface of the film with respect to the parting face of the first die,
    the feeding unit includes a feeding shaft that determines a feed amount of the film, and a feeding pinch roller capable of pressing the film to the feeding shaft such that the film travels in response to a rotation of the feeding shaft, and
    the winding unit includes a drawing shaft that determines tension applied to the film, and a drawing pinch roller capable of pressing the film to the drawing shaft such that the film travels in response to a rotation of the drawing shaft.

* * * * *